United States Patent [19]

Gaughen

[11] Patent Number: 4,584,790
[45] Date of Patent: Apr. 29, 1986

[54] SEED MAT AND METHOD AND APPARATUS FOR MANUFACTURING IT

[76] Inventor: Thomas P. Gaughen, Rte. 1, Cedar Bluffs, Nebr. 68015

[21] Appl. No.: 668,890

[22] Filed: Nov. 6, 1984

[51] Int. Cl.⁴ .......................... A01C 1/04; B32B 31/00
[52] U.S. Cl. .......................................... 47/56; 156/276
[58] Field of Search ..................... 47/56, 9; 156/276

[56] References Cited

U.S. PATENT DOCUMENTS

| | | | |
|---|---|---|---|
| 2,909,003 | 10/1959 | Marshall | 47/56 |
| 2,923,093 | 2/1960 | Allen | 47/56 |
| 3,914,901 | 10/1975 | Muldner | 47/56 |
| 4,066,490 | 1/1978 | Yoshimi | 47/56 X |
| 4,190,981 | 3/1980 | Muldner | 47/56 |
| 4,283,880 | 8/1981 | Fjeldsa | 47/56 |
| 4,414,776 | 11/1983 | Ball | 47/56 |

FOREIGN PATENT DOCUMENTS 2219448 10/1973 Fed. Rep. of Germany .......... 47/56
488392 7/1938 United Kingdom ................... 47/56

Primary Examiner—Robert E. Bagwill
Attorney, Agent, or Firm—Vincent L. Carney

[57] ABSTRACT

To manufacture a seed mat, a conveyor moves a layer of straw from a distribution bin where it is distributed against the top run of the conveyor belt which carries it underneath low pressure glue sprayers. After the glue is sprayed on, starter fertilizer granules are gravity fed on and a layer of paper is applied on top of it with a pressure roller. Glue is lightly sprayed on top of the paper and seed properly distributed in a fashion so that it may be visibly observed for quality control. After the seeds have been distributed in the glue, another layer of paper is placed on top of it and the mat runs through a drying oven to remove excess moisture at a temperature of between 100 to 140 degrees Fahrenheit for between one minute and three minutes.

12 Claims, 7 Drawing Figures

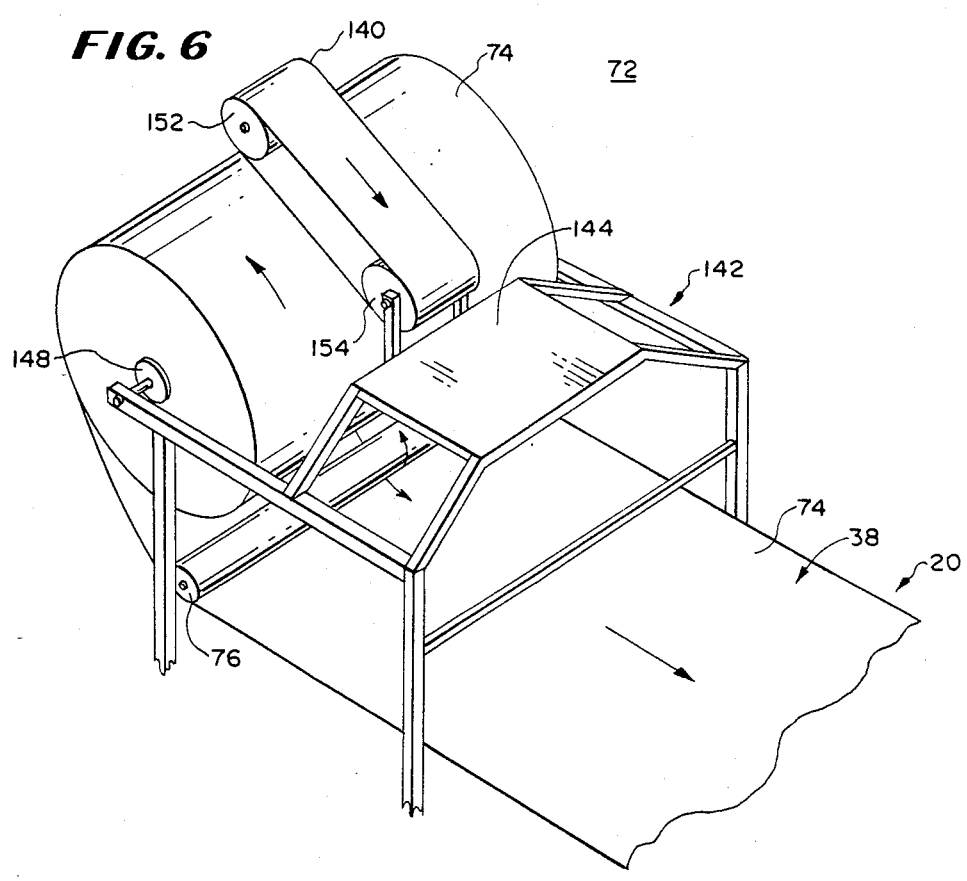
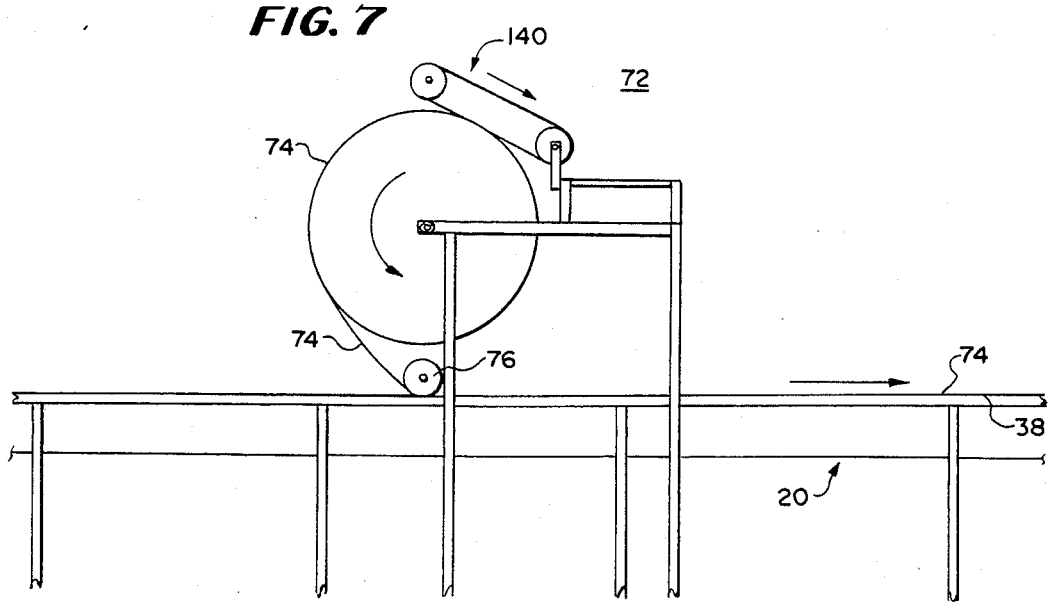

SEED MAT AND METHOD AND APPARATUS FOR MANUFACTURING IT

BACKGROUND OF THE INVENTION

Seed mats are known which include a paper backing and mulch layers for strength. These mats are prepared on conveyors which carry the mulch: (1) to a station where glue is sprayed on it; (2) to a station where other layers of fertilizer on paper or the like are applied; and (3) to a station where seed is applied.

In a prior art mat and method of manufacturing it, the glue is applied to straw mulch and seed applied to the glue on the straw. in another embodiment, adhesive is applied to paper, mulch is applied and then fertilizer and seed are glued to the mulch.

The prior art mats and methods of manufacturing them have several disadvantages such as: (1) quality control is poor; (2) seeds are not exposed to soil and moisture readily for easy germination when the mat is used; (3) it is difficult to inspect for proper seed distribution and seeding rate; and (4) seed is not fastened securely enough to withstand shaking during transportation and layering of the mat without becoming free of their location.

SUMMARY OF THE INVENTION

Accordingly, it is an object of the invention to provide a novel seed mat.

It is a further object of the invention to provide a novel method for manufacturing a seed mat.

It is a still further object of the invention to provide a novel apparatus for manufacturing a seed mat.

It is a still further object of the invention to provide a seed mat which contains properly distributed seed.

It is a still further object of the invention to provide a seed mat in which the seeds are well protected and positioned adjacent to the ground with a strong mulch cover.

It is a still further object of the invention to provide a method of manufacturing a seed mat which is particularly susceptible to good quality control for the distribution of seed and seed rate.

In accordance with the above and further objects of the invention, a seed mat includes a bottom layer of paper to be positioned adjacent to the ground with seeds adhered to it in a pattern providing a selected count for a given area of the pattern and with the distance between seeds being sufficiently uniform from seed to seed so that the variation in each square foot of the pattern differs by less than 40 percent and the variation in the number of seeds is less than plus or minus twenty percent. A top layer of paper is fastened across the seeds with a thin layer of glue. Fertilizer is above the top paper layer and mulch above the fertilizer.

The mat is prepared on a conveyor with the straw being distributed onto the conveyor by a novel distributing mechanism. Water dispersed glue is sprayed on top of the straw under low air pressure to keep the straw from being spread by the air pressure used in spraying or by the momentum of the glue spray and fertilizer fed onto the straw above the glue.

A first paper sheet which is to be the top paper sheet is rolled on top of the straw, fertilizer and glue, being moved by the force of the conveyor and held down by a roller. Glue is lightly sprayed on top of this sheet of paper and seed distributed on the paper at the proper seeding rate and distribution for that particular seed, after which a second layer of paper, which is to be the bottom layer, is pulled across the top. The entire mat then runs through a heating tunnel sufficient to remove excess moisture and prevent germination until use, after which it is cut to the proper length.

The proper seeding rate is a rate of distributing seed that provides substantially the same number of seeds in each square foot of pattern. The pattern in the preferred embodiment is the entire surface of the paper, but can be another pattern such as one or more straight lines across the surface for row crops. By substantially the same number of seeds, this specification means that each square foot will have the same number of seeds plus or minus 20 percent. By proper distribution, this specification means relatively even spacing between seeds such that the variation from area to area does not differ by more than a plus or minus 20 percent when any one square foot of area is compared to another square foot of area. In this specification, such a distribution is referred to as an even distribution.

From the above description, it can be understood that the mat of this invention and the method and apparatus for manufacturing it have several advantages, such as: (1) the mat has properly distributed seeds; (2) the mat is strong and permits application of the seed close to the ground with a good cover of mulch for easy germination; (3) the quality of the mat may be easily controlled for uniform distribution of seed and selected seed rate; and (4) it is economical and easy to make a good quality mat.

SUMMARY OF THE DRAWINGS

The above noted and other features of the invention will be better understood from the following detailed description when considered with reference to the accompanying drawings in which:

FIG. 6 is a simplified perspective view of a wind down as used of the embodiment of FIGS. 1 and 2; and FIG. 7 is a simplified side elevational view of the wind down of FIG. 6.

DETAILED DESCRIPTION

Figure 1:
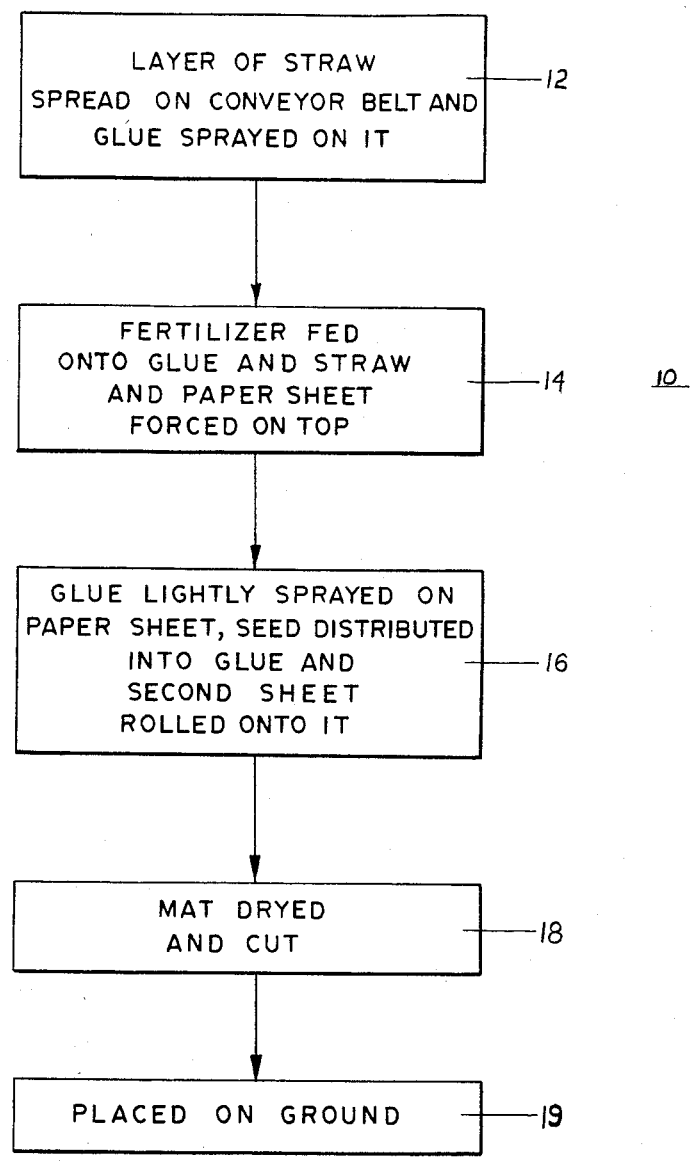
FIG. 1 is a block diagram illustrating the process of the invention.

In FIG. 1, there is shown a block diagram illustrating a process of making seed mats including five generalized steps, which are: (1) the step 12 of preparing a layer of straw on a conveyor belt and spraying glue heated to between 100 and 130 degrees Fahrenheit on it with an air pressure of between 10 and 20 pounds per square inch; (2) the step 14 of applying fertilizer onto the glue and rolling a paper sheet on top of the glue; (3) the step 16 of lightly spraying glue on the sheet and distributing seed on the sheet with the proper rate and distribution; (4) the step 18 of drying the mat in a tunnel and cutting it to size; and (5) the step 19 of reversing the mat for use so that when placed on the ground, the seed is separated from the ground only by a single sheet of paper.

To provide a layer of mulch and increase the strength of the mat, dry straw is chopped into strands of between ⅛ inch to 1½ inches, cleaned from excess dust and held in a distribution bin. It is spread on the conveyer in a controlled layer with a thickness of approximately ⅛ inch to ½ inch and glue is sprayed on it with a pressure sufficiently low to prevent it from blowing away in the first stage 12 of the process 10. The air pressure should be in the range of 10 to 25 pounds per square inch.

While in the preferred embodiment, straw is used as the mulch and has a length which, because of its bonding strength, will provide additional strength to the mat, other mulch materials may be used. Such materials must be biodegradable and have sufficient resistance to the permeability of water so as to hold water within the soil against evaporation.

To provide fertilizer and a surface for controlling the distribution of seed in the mat, fertilizer granules are fed onto the glue above the straw and a paper roll is spread over the mat as a top surface in the second stage 14 of the process 10. It is useful for the paper to be smooth and of a color contrasting with that of the seed so the seed is visible against it for quality control inspection. Each paper should be biodegradable, no more than a 20 pound weight and have a low wet strength so that its germination and subsequent growth are not impaired.

While paper is used in the preferred embodiment, other sheet materials may be used having the characteristics of: (1) low toxicity to seed; (2) forming a surface against which seed may be observed for quality control purposes as to rate and location of distribution; and (3) having sufficient water permeability and low wet strength to and the release of seed in rainfall or watering.

To provide a distribution of seed with a selected number of seeds per square inch and desired spacing between seeds, in the third stage 16 of the process 10, glue is lightly sprayed onto the surface of the paper and seed is gravity fed from applicators having a sufficient number of holes to form a thin layer of seed. Distribution and seeding rate are observed for quality control purposes and marked if unsatisfactory for removal. Another layer of thin paper is put over the top so that the seed is sandwiched between two layers of paper. The bottom paper is sufficiently thin so that the seed may be observed by its impression in it as a second check against improper distribution. The second layer must also be biodegradable and have low wet strength.

To permit storage of the mat for long periods of time, the mat is dried to remove excess moisture and thus prevent germination in the fourth stage 18 of the process 10. It is then cut to size.

In use, the mat is placed upon the ground with a first layer of paper against the ground and the seed being on top of the first layer of paper. With this arrangement, the straw forms a mulch above the seed and the seed is easily released into the ground where fertilizer is leached onto it and into the soil in use.

Figure 2:
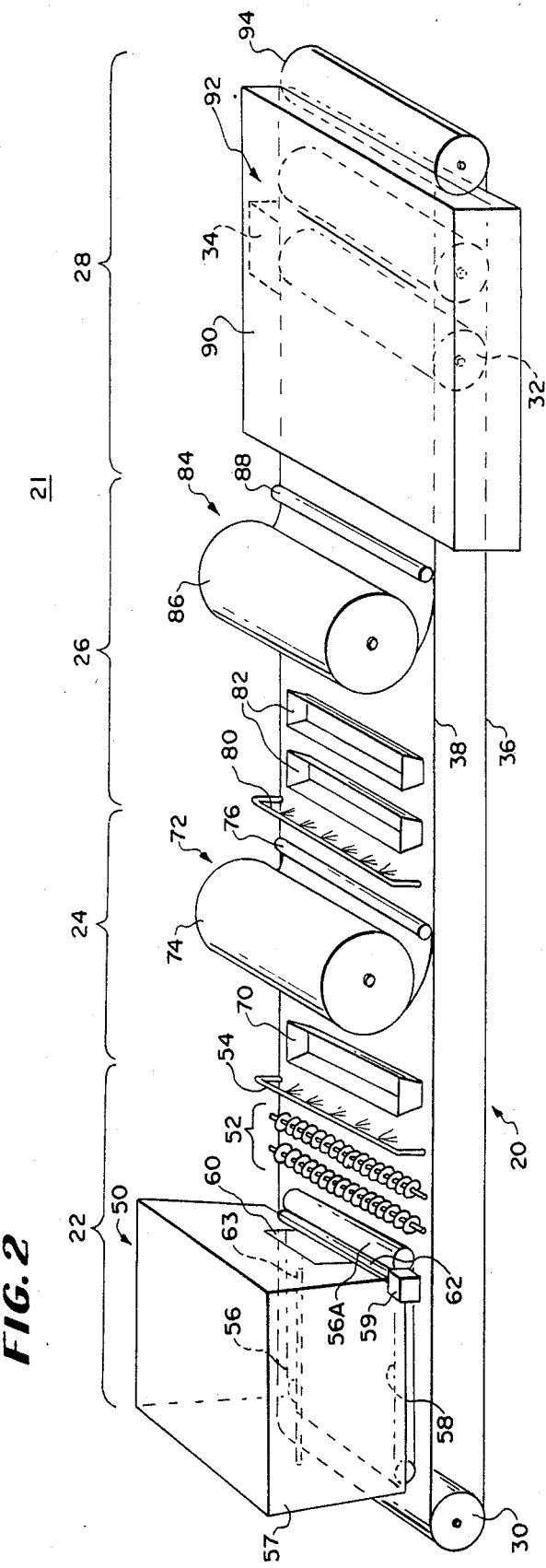
FIG. 2 is a simplified, partly schematic, perspective view showing the apparatus and method for manufacturing the mat of this invention.

In FIG. 2, there is shown a simplified perspective drawing of a system 21 for preparing the seed mat including a conveyer 20, a first stage 22 of the conveyer 20 which performs step 12 of FIG. 1, a second stage 24 which performs step 14 of FIG. 1, a third stage 26 which performs step 16 of FIG. 1 and a fourth stage 28 which performs step 18 of FIG. 1. The conveyor 20 carries the partially formed mat in the named order from the first stage 22, through the second stage 24, the third stage 26 and the fourth stage 28 to form a finished mat.

To carry the mat from stage to stage, the conveyor 20 includes a first sprocket wheel 30, a second sprocket wheel 32, a drive motor 34 for driving the sprocket wheel 32 and an endless belt. The endless belt includes upper and lower belt runs 38 and 36 respectively, driven in a direction from the first stage to the fourth stage at the top run and in the opposite direction at the bottom run by the drive motor 34. The conveyor itself may be conventional and have any surface capable of carrying the mat. It should be a smooth surface resistant to being wetted by adhesive and easily cleaned.

The first stage 22 includes a distribution bin 50, a leveling auger 52 and a glue sprayer 54, all positioned in the order described between the first sprocket wheel 30 and the end of the first stage 22 adjacent to the conveyor 20 to cooperate therewith. The distribution bin 50 includes four substantially vertical walls 57 two of which slant upwardly and outwardly, defining an enclosure, a feeder roller 62, a stirrator (stirring implement) to fluff straw 63 and a conveyor 56.

To distribute straw onto the conveyor 20, the enclosure formed by walls rests above the top run 58 of the conveyor 56. The top run 58 is driven by a motor 59 to move in the direction of the top run of the conveyor 20. Straw on the top run 58 is carried through an opening 60 fed by a feeder roller 62 at the bottom of the walls 57 where it drops onto conveyor 20. The two conveyors 56 and 20 have approximately four foot wide belts so that the straw from the distribution bin 50 is moved by the top run 58 through the opening 60 onto the belt of conveyor 20 and spread across the width of the conveyor. The feeder roller 62 at the exit opening 60 of the distribution bin 50 rotates in a direction opposite to the conveyor belt and forces the straw against the top run 38 of the conveyor 20 to compact it as it moves toward the leveling auger 52.

After leaving the distribution bin 50, the compacted straw moves to two leveling augers 52 which rotate counterclockwise to spread straw across the conveyor in a manner known in the art. From there the straw passes under the sprayers 54 which are low pressure sprayers with sufficient size fluid tip orifaces and with adjustment to deposit a substantial amount of glue under an air pressure creating a force sufficiently low to not blow the straw away. The tips are adjustable to obtain the proper pressure.

The second stage 24 of the system 21 includes a fertilizer hopper 70 and a paper applicator 72 positioned with the fertilizer hopper 70 being closer to the distribution bin 50 of the conveyor 20 than the paper roller 72 and both being positioned in juxtaposition with the top run 38 of the conveyor 20. The fertilizer hopper 70 includes fertilizer granules which it distributes over the four foot top surface of the conveyor belt on top of the straw and glue to adhere thereto. After the fertilizer is in place, the paper applicator 72 rolls a thin sheet of paper on top of the straw and the fertilizer to hold it in place and form a distribution bed for the seed.

To pull the top layer of paper along the conveyor belt, the paper applicator 72 includes a roll 74, containing paper, and a pressure roller 76, with the pressure roller 76 forcing the paper from the roll 74 against the top surface of the top run 38 of the conveyor 20 so that as the conveyor belt moves, the paper is pulled by the driving force of the top run 38 to unwind it from the roll 74. The roll 74 and the pressure roller 76 may be driven but it is not necessary if sufficient biasing force is applied to the pressure roller 76 to confine the paper. The pressure roller 76 should have a Teflon (tetrafluoroethylene) or similar surface to which the glue will not stick.

The third stage 26 includes a glue distributor 80, seed bins 82 and a second bottom paper roller applicator 84 positioned in the order described from the side closest to the straw distributor 50 so that the belt moves the partially formed mat under the glue distributor 80, the seed bins 82 and the paper roller 84.

To apply a thin layer of glue over the surface of the paper above the straw and fertilizer, the adjustable glue distributors 80 are set to form a spray of a suitable glue in a thin layer. The surface of the paper is of a color and sufficiently smooth so that the seed distributed by the seed bins 82 across the surface can be visibly seen and counted for rate and proper distribution. In this manner, quality control can be applied at this station to detect places where the seed is too thin or not properly applied. While two seed bins are shown, more than one may be used and two are shown because convenient commercial seed bins provide an adequate distribution with two in series.

To apply the bottom layer of paper, the paper applicator 84 includes a roll of paper 86 and a pressure roller 88 in a manner similar to the paper applicator 72 so that the pressure roller 88 forces the paper against the moving partially formed mat so as to cause it to be pulled and unwound from the paper roll 86 by the top run 38 of the conveyor 20.

The fourth stage 28 includes a drying tunnel 90 and a cutter 92. The drying tunnel 90 encases the dry roller 32 and includes a heater and fan for recirculating air in a manner known in the art. The speed of the conveyor 20 and the length of the drying tunnel 90 is sufficient so that the mat remains in it for at least one minute at a temperature of at least 100 degrees Fahrenheit. The temperature and air must be such as to remove excess moisture and thus prevent germination during storage. In the preferred embodiment, the temperature is 130 degrees Fahrenheit within the drying tunnel 90 and the tunnel is 40 feet long. The temperature should be in the range of between 100 and 140 degrees Fahrenheit and the mat should be in the tunnel from between one minute and three minutes. The time is controlled by the length of the tunnel and the speed of conveyor 20.

The cutter 92 is a conventional cutter with fingers that grasp the mat, pull it across rollers 94 and cut it across a cutting roller at preset time increments. The motor 34 may be of any conventional type, but for best results, it is adjustable in speed. It must be sufficient to support the load and pull the conveyor but nothing more is required of it. The mat is wound automatically or manually.

Figure 3:
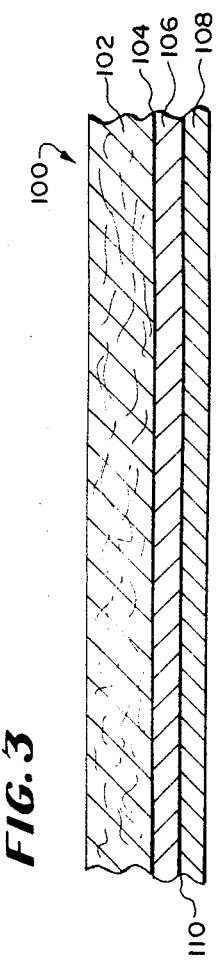
FIG. 3 is a sectional view of an embodiment of the invention.

In FIG. 3, there is shown a section of a mat 100 having a layer of straw 102 with a glue and fertilizer interface at 104. A top layer of paper is glued to the layer 102 and contains between it and a bottom layer of paper 108 a layer of glue and seed 110.

The bottom layer 108 is thin paper so that the seed can be perceived through it by impressions and in the preferred embodiment the top and bottom layers of paper 106 and 108 are both of the same weight, biodegradable, non-toxic and have no wet strength so that they are easily disintegrated upon watering. The glue is non-toxic and water dispersed so that it flows free and releases the seed into the ground under the mulch 102 which is approximately $\frac{1}{8}$ to $\frac{1}{2}$ inch thick and provides cover for moisture while the seeds germinate.

Any type of seed may be used, but in the preferred embodiment grass seed is used. It may be selected by area and instead of grass seed, flower or vegetable seeds may be used. The seeding rate and distribution varies in accordance with agronomic principles for the particular crop and locality.

The fertilizer granules may be of any suitable type to give a start in establishing the plants. Generally, it will contain nitrogen, phosphorus and potassium in a form which is readily usable. The starter type is the preferred embodiment and includes a higher percentage of phosphorus materials usable by the plant. A fertilizer containing nitrogen, phosphorus and potassium is used. The fertilizer rate is adjusted to supply between 0.5 and one pound of phosphorus ($P_2O_5$) for every 1,000 square feet of mat. Some known fertilizers are urea, methylene urea, calcium nitrate, ammonium nitrate, ammonium phosphates, single and triple phosphates, nonorthophosphates, muriate of potash and so on. Moreover, different ratios and mixtures of such common ingredients may be used.

The glue should be in a water dispersion and non-toxic. In the preferred environment, polyvinyl acetate is used but there are many other types of suitable glues. It must be of sufficiently low viscosity to be sprayed under low pressure in the first applicator and thinly applied in the second glue applicator. The paper in the preferred embodiment is between 10 and 30 pounds in weight and contains no wet strength. It is biodegradable and non-toxic to seed.

Figure 4:
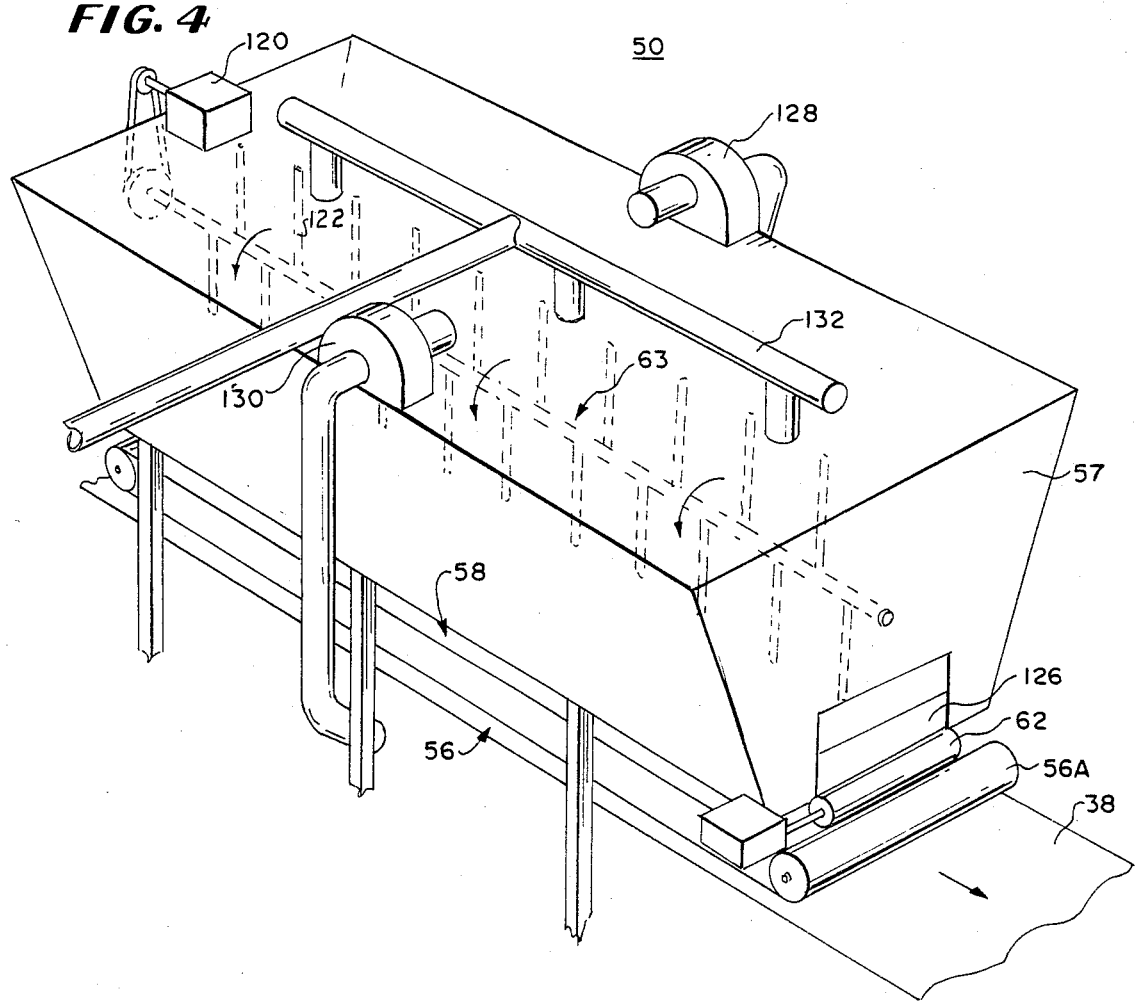
FIG. 4 is a simplified perspective view of a feedstock hopper as used in the embodiment of FIGS. 1 and 2.

In FIG. 4, there is shown a simplified perspective view of the distribution bin 50 having a height of four feet with substantially vertical sides 57 spaced parallel from each other along the top run 38 a distance from each other of 20 feet to provide a 20 foot long bin and sides 57 perpendicular to the insides slanting inwardly from the top and being spaced from each other at their top edge by ten feet and at their bottom edges by four feet. The top is openable so as to insert straw which slides toward the bottom where it may impact against the top run 58 which rotates about the end rollers 56A of the conveyor 56.

Within the bin 50, is the stirrator 63 having a 1 $\frac{3}{4}$ inch diameter shaft extending along the 20-foot length of the bin 50 and rotated by a one-horse power motor 120. The shaft has a plurality of perpendicularly extending three feet along stirrators 122 which are rotated so as to distribute the straw and stir it over the top run 58.

An opening in the bin has mounted to it the feeder roller 62 which rotates in the opposite direction as the top run 58 so as to permit a layer of straw to be deposited on the top run 38 of the conveyor 20. The opening 126 is approximately 42 inches wide.

Two vacuum blowers 128 and 130 remove straw from the bottom of the bin 50 and deposit it back in the bin. The straw falls to the bottom by following the top run 58 around the roller rather than onto the top run 38. Also mounted through the top cover is a conduit 132 having three openings into the bin 50 and a relatively low air pressure suction source to remove dust from the bin 50.

Figure 5:
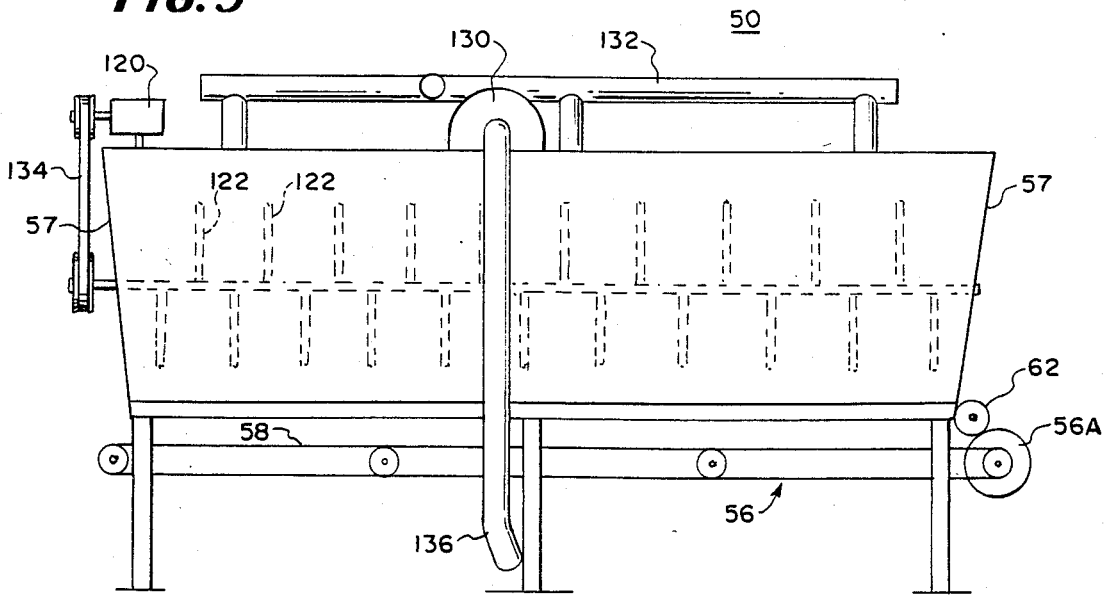
FIG. 5 is a side elevational view of the hopper of FIG. 4.

In FIG. 5, there is shown in elevation, the positioning of the feed roller 62 with respect to the top run 58 of the conveyor 56 and the stirrators driven by the motor 120 through the belt drive 134 as best shown in this view. The vacuum 130 (one of which is shown in FIG. 5) is connected by six inch diameter 10-foot long conduit 136 to a location below the conveyor 56 and also below the conveyor 20 (not shown in FIG. 5) where it picks up straw and returns it to bin 50.

In FIG. 6, there is shown a perspective view of the paper applicator 72, which is substantially the same as the paper applicator 84 (FIG. 2). The paper applicator or wind down 72 will be described herein with the understanding that the paper applicator 84 is of substantially the same construction and need not be so described.

As best shown in FIG. 6, the paper applicator 72 includes a roll of paper 74, a guide belt 140, a motor frame 142 and the pressure roller 76. The paper is held against the top belt run 38 of the conveyor 20 by the pressure roller 76 so as to be pulled along the top run and unwind the paper 74 which is held in place by the guide belt 140. The frame 142 may be used to mount a motor so as to drive the guide belt 140 and/or pressure roller 76 if desired. It is not shown in FIG. 6.

To hold a motor when necessary, the platform 142 is formed of 2"×2" square tubes with a 2'×2' platform 144. The motor may be connected to the shafts of the guide belt 140 or pressure roller 76 by any conventional pressure drive.

The paper roll 74 is rotatably supported on an axle which has a diameter within the range of 4 inches to 6 inches shown at 148 and is generally a roll of paper having a diameter of no greater than approximately 40 inches with the paper being 4 feet wide. The guide belt 140 is approximately 88 inches long and 6 inches wide and positioned over two 10-inch pulleys 152 and 154 with the belt being driven by the roll of paper and biased there against by gravity. This holds the paper firmly as it is pulled along the top belt run 38 of the conveyor 20.

To hold the paper roll 74 against the top belt run 38 of the conveyor 20, the pressure roller 76 has a diameter of 4 inches and is coated with Teflon. It is slightly in excess of 4 feet long and biased against the top belt run 38 of the conveyor 20.

In FIG. 7, there is shown a simplified elevational view illustrating how the paper roll 74 is pulled along the top belt run 38 of the conveyor 20 by the pressure roller 76 which holds it firmly there against and rotates both the paper roll and the guide belt 140, with the guide belt 140 resting against the roll so as to reduce the tendency of the paper to become slack and hold the roll tightly together.

From the above description, it can be understood that the seed mat and process for making it of this invention has several advantages, such as: (1) it is capable of good quality control; (2) the mat is ideally suited for storage and good germination; (3) it is sufficiently strong and flexible and able to hold the ground while starting seed; and (4) it is economically made.

While a preferred embodiment has been described with some particularity, many modifications and variations of the preferred embodiment may be made within the scope of the above techniques. Therefore, it is to be understood that, within the scope of the appended claims, the invention may be practiced other than as specifically described.

What is claimed is:

1. Apparatus for forming a seed mat for seeds of a predetermined color comprising:
   first conveyor means having a predetermined width and length for moving material along its length;
   a plurality of stations spaced-apart along the length of the conveyor means;
   distribution bin means for distributing mulch on the conveyor;
   said distribution bin means being located at a first of said stations and including a second conveyor means;
   the side walls of said distribution bin forming an enclosure, an opening and a roller;
   said second conveyor means being positioned between said first conveyor and said side walls forming an enclosure with the direction of motion of its top run being toward the opening to move straw from the bin onto the first conveyor means;
   the roller being adjustably held against said first conveyor means near said opening to compact said material;
   first glue spraying means at a second station for spraying glue at an air pressure of between 10 and 25 pounds per square inch in a layer on top of said mulch as it moves down said conveyor from said first station;
   fertilizer distributor means at the second station for applying fertilizer to said glue and mulch;
   first paper applicator means positioned adjacent to said conveyor at the second station for applying first paper on top of said mulch, glue and fertilizer;
   said first paper being less than twenty pounds in weight, smooth surfaced, biodegradable and of a color contrasting to the color of said seeds;
   second glue spraying means for spraying a light application of glue on top of said first paper;
   seed distribution means for evenly distributing seed on top of said first paper;
   second paper applicator means for applying second paper to said mat on top of said seed;
   said second paper being less than twenty pounds in weight, smooth surfaced, biodegradable and of a color contrasting to the color of said seeds;
   heat tunnel means for drying said mat; and
   means for cutting said mat into predetermined sections.

2. Apparatus according to claim 1 further including means for driving said roller in a direction opposite to the endless belts of said first conveyor means.

3. A seed mat comprising:
   a biodegradable, substantially smooth first sheet;
   a diodegradable second sheet;
   a layer of seed and glue between said first sheet and said second sheet;
   a layer of mulch adhered to the second sheet;
   said seed being of a different color than said first sheet and evenly spaced so that there is the same number of seeds for each square foot of first sheet plus or minus twenty percent;
   the fertilizer and mulch being flued to the second sheet.

4. A seed mat according to claim 3 further including starter fertilizer between said mulch and said second sheet.

5. A seed mat according to claim 3 in which the layer of mulch is one-eighth to one-half inch thick and the glue is water-dispersed.

6. A seed mat according to claim 5 in which the fertilizer contains phosphorus in an amount of between 0.5 pounds and one pound for every 1,000 square feet.

7. A seed mat according to claim 6 in which the glue is polyvinyl acetate.

8. A method of manufacturing a seed mat comprising the steps of:
- moving a layer of mulch along in a continuous path;
- spraying glue under low pressure on said mulch;
- applying fertilizer to said mulch;
- applying a thin first sheet of smooth, biodegradable material on top of said glue, mulch and fertilizer;
- applying glue to said first sheet of smooth, biodegradable material;
- distributing seed on said sheet of smooth, biodegradable material;
- applying a second sheet of smooth, biodegradable material on top of said first sheet, glue and seed; and
- drying said mat.

9. A method according to claim 8 in which the mat is dried in a heat tunnel.

10. A method according to claim 9 in which the mat is dried at a temperature in excess of 100 degrees Fahrenheit for at least one minute.

11. A method according to claim 10 in which the step of drying the mat includes the step of running the mat on a conveyor through a heat tunnel.

12. Apparatus for forming a seed mat including:
- a conveyor;
- a distribution bin means for distributing mulch on the conveyor;
- low pressure first glue spraying means for spraying glue in a layer on top of said mulch as it moves down said conveyor;
- fertilizer distributor means for applying fertilizer to said glue and mulch;
- first paper applicator means positioned adjacent to said conveyor for applying a first paper on top of said mulch, glue and fertilizer;
- second glue spraying means for spraying a light application of glue on top of said first paper;
- seed distribution means for distributing seed on top of said first paper with an even distribution over a predetermined area;
- second paper applicator means for applying a second paper to said mat; and
- means for drying said mat.

* * * * *